United States Patent
Ghosh et al.

(10) Patent No.: US 7,352,730 B2
(45) Date of Patent: Apr. 1, 2008

(54) JOINT CHANNEL AND NOISE VARIANCE ESTIMATION IN A WIDEBAND OFDM SYSTEM

(75) Inventors: Monisha Ghosh, Chappaqua, NY (US); Vasanth Gaddam, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 331 days.

(21) Appl. No.: 10/524,178

(22) PCT Filed: Jul. 31, 2003

(86) PCT No.: PCT/IB03/03392

§ 371 (c)(1),
(2), (4) Date: Feb. 10, 2005

(87) PCT Pub. No.: WO2004/015946

PCT Pub. Date: Feb. 19, 2004

(65) Prior Publication Data

US 2006/0114981 A1   Jun. 1, 2006

(51) Int. Cl.
*H04Q 7/24* (2006.01)
*H03K 5/159* (2006.01)

(52) U.S. Cl. ............... 370/338; 370/208; 370/332; 375/232; 375/260

(58) Field of Classification Search .......... 370/338, 370/430, 330–332, 350, 203–204, 208–215, 370/503; 375/232, 260, 343; 455/423, 432.2, 455/63.1, 432.1
See application file for complete search history.

(56) References Cited

U.S. PATENT DOCUMENTS

2002/0101840 A1* 8/2002 Davidsson et al. ......... 370/330
2004/0170227 A1* 9/2004 Frank et al. ................ 375/260
2004/0180666 A1* 9/2004 Wenger et al. ............. 455/450
2006/0227904 A1* 10/2006 Mueller-Weinfurtner et al. 375/343

FOREIGN PATENT DOCUMENTS

EP   1176750 A1   1/2002

OTHER PUBLICATIONS

"On Channel Estimation in OFDM Systems", by Jan-Jaap Van De Beek et al., IEEE 1995, pp. 815-819, XP000551647.
"Bluetooth Interference Cancellatation for 802.11g WLAN Receivers", by Monisha Ghosh et al, IEEE 2003, pp. 1169-1173, XP002264769.

* cited by examiner

*Primary Examiner*—Pablo N. Tran
(74) *Attorney, Agent, or Firm*—Larry Liberchuk (57) ABSTRACT

A method and system for use in a wireless-local-area network (WLAN), for simultaneously estimating the unknown multi-path channel and noise characteristics and using the channel and noise estimates to improve system performance in the presence of narrowband interferers. Estimates are made for the unknown multi-path channel and noise characteristic without a-priori knowledge of the location of the interference in the band and this information is used to generate soft-metrics for a Viterbi decoder. By using the improved channel and noise estimates, the packet error rate (PER) of an 802.11g WLAN system may be maintained despite collisions with interfering packets thereby allowing the 802.11g system to be less sensitive to the interference.

16 Claims, 11 Drawing Sheets

EQUATION (8)

$$\begin{bmatrix} h_0 \\ h_1 \\ h_2 \\ \vdots \\ \vdots \\ h_{63} \end{bmatrix} = \begin{bmatrix} e^{j2\pi K} \end{bmatrix} \begin{bmatrix} h_0 \\ h_1 \\ h_2 \\ \vdots \\ h_{15} \\ 0 \\ 0 \\ 0 \\ \vdots \\ 0 \end{bmatrix}$$

$$R_n = \begin{bmatrix} \sigma_\omega^2 & \cdots & 0 & \cdots & 0 \\ \vdots & \vdots & \vdots & \vdots & \vdots \\ 0 & \cdots & \sigma_b^2 + \sigma_\omega^2 & \cdots & 0 \\ \vdots & \vdots & \vdots & \vdots & \vdots \\ 0 & \cdots & \cdots & \sigma_b^2 + \sigma_\omega^2 & 0 \\ 0 & \cdots & \cdots & \cdots & \sigma \end{bmatrix}$$

JOINT CHANNEL AND NOISE VARIANCE ESTIMATION IN A WIDEBAND OFDM SYSTEM

The present invention relates generally to communication systems, and more particularly to an improved system and associated method for performing narrowband interference cancellation in a wideband orthogonal frequency modulation local area network.

The IEEE 802.11 WLAN standard provides a number of physical (PHY) layer options in terms of data rates, modulation types and spreading spectrum technologies. Three physical layers were standardized in the initial revision of 802.11. They include a direct sequence (DS) spread spectrum PHY, a frequency-hopping (FH) spread spectrum PHY and an infrared light (IR) PHY. All three architectures are designed for operation in the 2.4 GHz band.

A second extension to the 802.11 standard, namely IEEE 802.11b, defines requirements for a physical layer based on direct sequence spread spectrum/complementary code keying (DSSS/CCK) for operation in the 2.4 GHz ISM frequency band, for data rates up to 11 Mbps. When the original 802.11b specification was approved, the IEEE concurrently approved the specs for 802.11a which was designed to use a PHY layer based on the orthogonal frequency division multiplexing (OFDM) for operation in the 5 GHz U-NII frequency for data rates ranging from 6 Mps to 54 Mps.

In November of 2001, the IEEE 802.11 committee adopted a draft standard, i.e., 802.11 g/D2.1, that proposes to reuse the OFDM physical layer (PHY) which is currently being used as the 802.11a standard in the 5 GHz band, for use in the 2.4 GHz band. A complete description of the 802.11g standard can be found in IEEE 802.11 g/D2.1, "Draft supplement to 802.11-1999, Wireless LAN MAC and PHY specifications: Further Higher-Speed Physical Layer (PHY) extensions in the 2.4 GHz band," incorporated by reference in its entirety. As is well known, the 802.11g standard uses bit interleaved coded modulation (BICM) in conjunction with orthogonal frequency division modulation (OFDM) to combat the effects of multi-path fading.

One drawback of adopting the OFDM PHY layer for use in the 2.4 GHz band is that the operating environments in the 2.4 GHz and 5 GHz bands are very different and hence implementations developed for 5 GHz, if used directly at 2.4 GHz may cause system degradation. In particular, one significant operating environment difference of note is the presence of Bluetooth systems in the 2.4 GHz band. Bluetooth is a computing and telecommunications industry specification that describes how mobile phones, computers, and personal digital assistants (PDAs) can easily interconnect with each other and with each other and with home and business phones and computers using a short-range wireless connection. A detailed description of Bluetooth can be found in K. V. S. S. S. S Sairam, et al., "Bluetooth in wireless communications," IEEE Communications Magazine, vol. 40, no. 6, pp. 90-96, June 2002, incorporated herein by reference in its entirety. Bluetooth systems are narrow band (i.e., 1 MHz bandwidth), frequency-hopped systems. By contrast, WLANS are wideband (i.e., 22 MHz bandwidth) systems with no frequency hopping. Studies have shown that the effect of Bluetooth interference on WLANs can be catastrophic in the case of collisions, i.e., in the case where a Bluetooth packet collides with an 802.11 packet, the error rate of the latter is very high. One such study can be found in I. Howitt, "WLAN and WPAN coexistence in UL band," IEEE transactions Veh. Tech., vol. 50, no. 4, pp. 1114-1124, July 2001, incorporated by reference, which shows that the performance of WLANS operating in accordance with 802.11g degrades dramatically in the presence of narrowband interferers such as Bluetooth. While interference avoidance mechanisms in the MAC layer can be useful, they are an incomplete solution in that they limit the available throughput of the WLAN system.

Therefore, there is a need for a PHY layer algorithm that allows a 802.11g WLAN system to be more robust in the presence of interference such as bluetooth interference.

The present invention is directed to a method and system for use in a wireless-local-area network (WLAN), for simultaneously estimating the unknown multi-path channel and noise characteristics and using the channel and noise estimates to improve system performance in the presence of narrowband interferers. The present invention estimates the unknown multi-path channel and noise characteristic without a-priori knowledge of the location of the interference in the band and uses this information to generate soft-metrics for a Viterbi decoder. By using the improved channel and noise estimates, the packet error rate (PER) of an 802.11g WLAN system may be maintained despite collisions with interfering packets thereby allowing the 802.11g system to be less sensitive to the interference.

Currently, conventional schemes for providing interference cancellation try to avoid collisions between interfering systems, such as Bluetooth, by using cooperative methods employed at the MAC layer. Avoiding collisions, however, has the disadvantage of lowering the overall bit-rate of the WLAN system, only allowing transmissions between bluetooth transmissions. There has been very little research on investigating methods of interference cancellation at the PHY layer. The present invention addresses this need by providing a method of interference cancellation defined at the PHY layer that allows the packet error rate (PER) of an 802.11g system to be maintained in the presence of bluetooth interference.

In a preferred embodiment, the present invention provides an improved method for estimating the multi-path channel and interference characteristics for use in a convolutional decoder at the PHY layer to improve system performance in the presence of narrowband interference from systems such as Bluetooth.

A more complete understanding of the method and apparatus of the present invention may be had by reference to the following detailed description when taken in conjunction with the accompanying drawings wherein:

FIG. 2b is a more detailed illustration of the construction of the PLCP preamble field of the data packet of FIG. 2a;

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
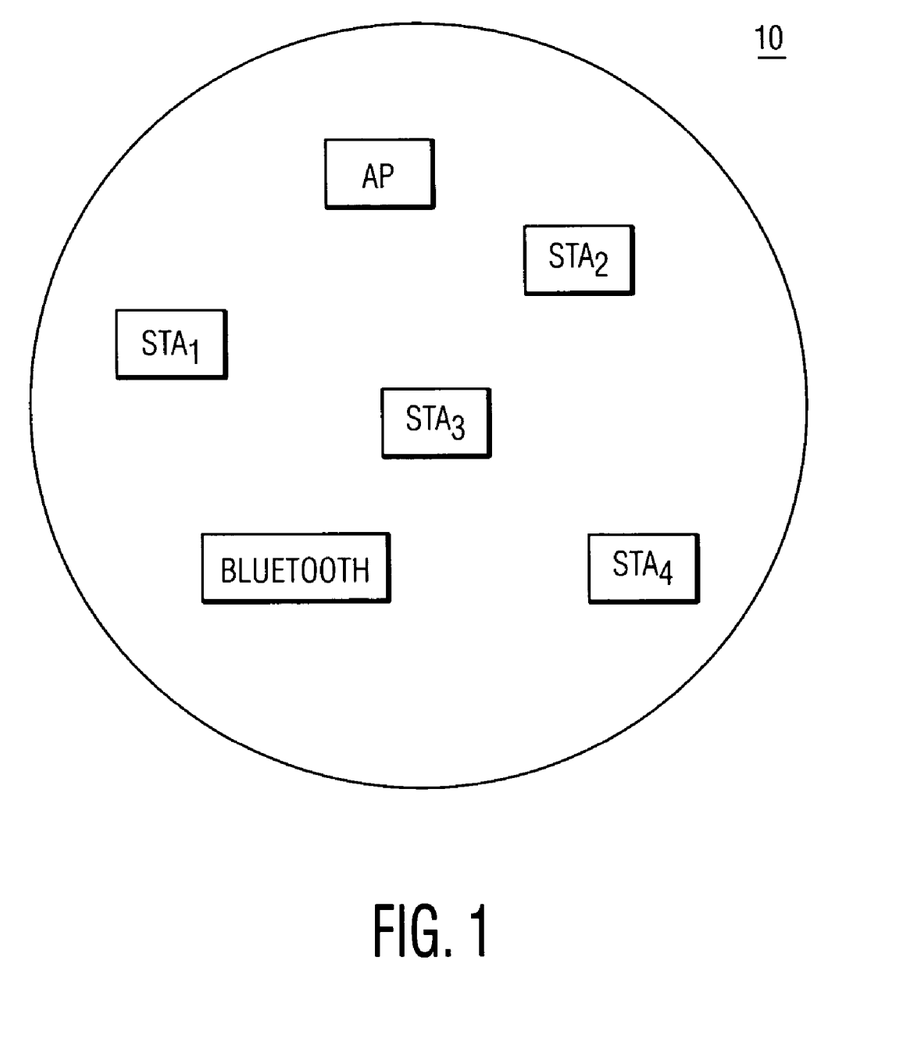
FIG. 1 illustrates a representative network whereto embodiments of the present invention may be applied.

FIG. 1 illustrates a representative network whereto embodiments of the present invention may be applied. As shown, a BSS network 10 includes a plurality of network nodes (e.g., AP, $STA_1$, $STA_2$, $STA_3$, and $STA_4$). It should be noted that the network shown in FIG. 1 is small for the purpose of illustration. In practice, most networks would include a much larger number of mobile STAs. It is also noted that while FIG. 2 and the following description are provided with reference to a BSS network, the principles of the invention apply equally to an IBSS network. In the network of FIG. 1, during a communication between at least two of the network nodes over air, a first network node (e.g., AP) serves as a transmitting network node and at least one second network node (e.g., $STA_2$) serves as a receiving network node for the purpose of transmitting data packets therebetween.

Figure 2A:
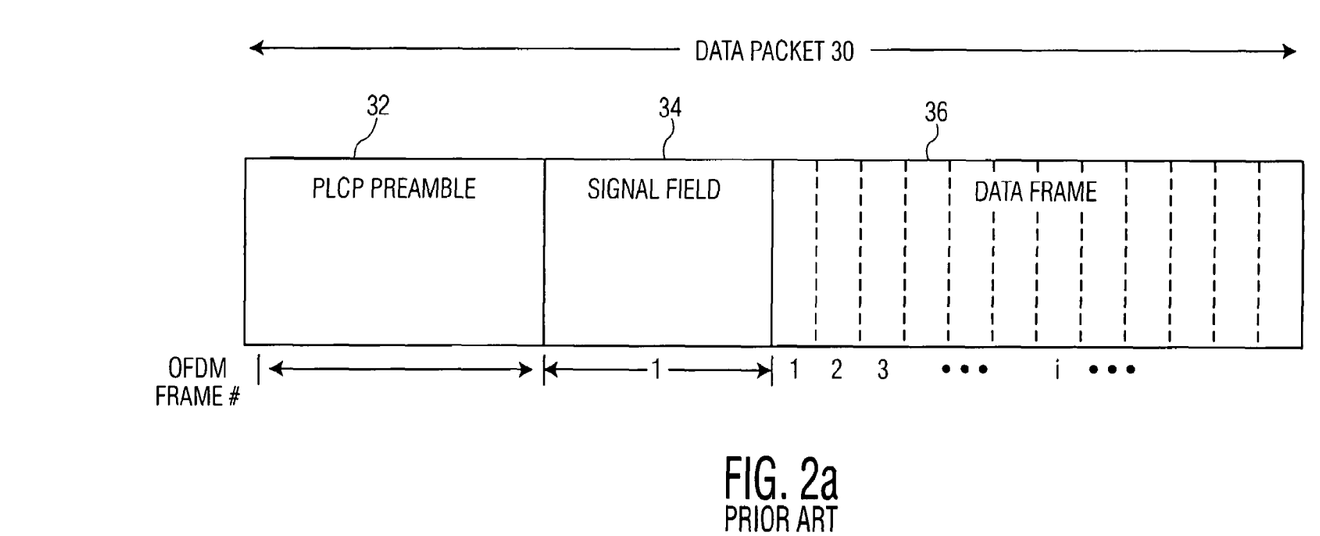
FIG. 2a illustrates the format of an IEEE 802.11g data packet 30 according to the IEEE 802.11g standard.

FIG. 2a illustrates the format of an IEEE 802.11g data packet 30 according to the IEEE 802.11g standard. A data packet can be of variable length, and is typically around 500-1500 bytes, corresponding to several OFDM frames. The data packet 30 shown has a format including three main fields: (1) a physical layer convergence procedure (PLCP) preamble field 32, (2) the signal field 34 and (3) the data field 36.

Figure 2B:
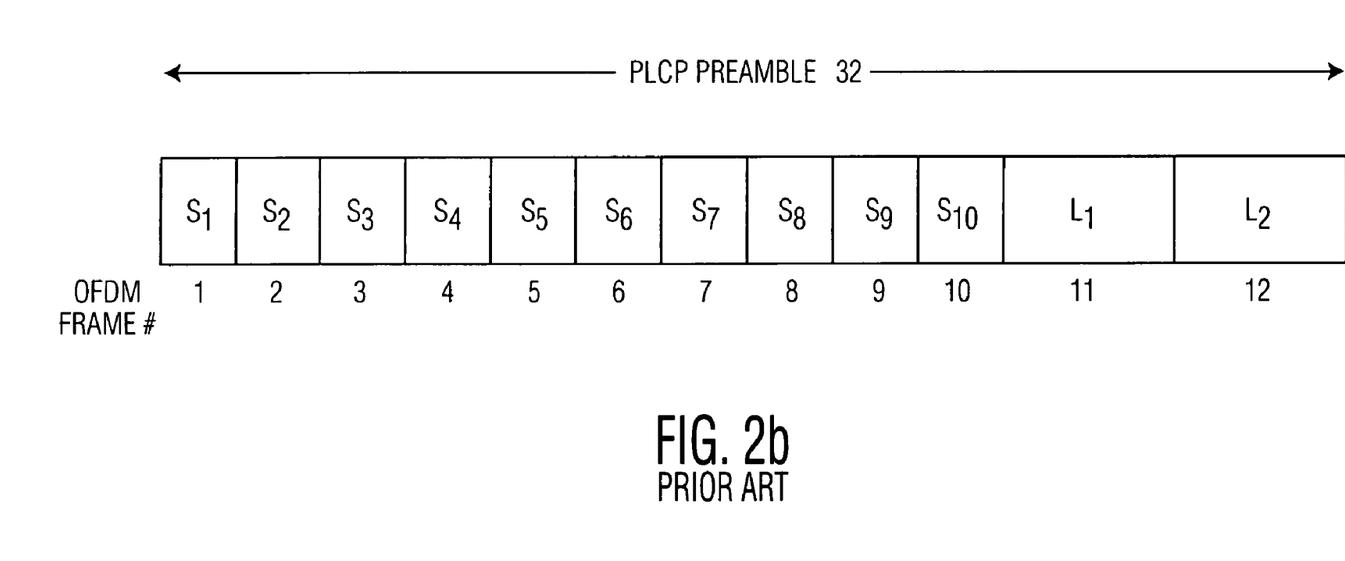

FIG. 2b is a more detailed illustration of the construction of the PLCP preamble field 32 of the data packet 30 of FIG. 2a. The preamble field 32 has a duration of 16 μsec and is comprised of ten repetitions of a short training sequence (i.e., $S_1$-$S_{10}$) and two repetitions of a long training sequence ($L_1$, $L_2$). The ten repetitions of the short training sequence $S_1$-$S_{10}$ serve to provide synchronization and timing at the receiver, the details of which are not applicable to the present invention. The two long training sequences ($L_1$, $L_2$) will be described below with reference to FIG. 2c. The signal 34 field of data packet 30 is comprised of one OFDM frame consisting of 24 bits which convey the data rate and the length of the data packet 30. The data field 36 of packet 30 is comprised of a variable number of OFDM frames using the mode specified in the signal field 34. The data field 36 contains the data bits that are to be transmitted from a transmitting node (e.g., AP) to a receiving node (e.g., $STA_1$) in the network 10.

Figure 2C:
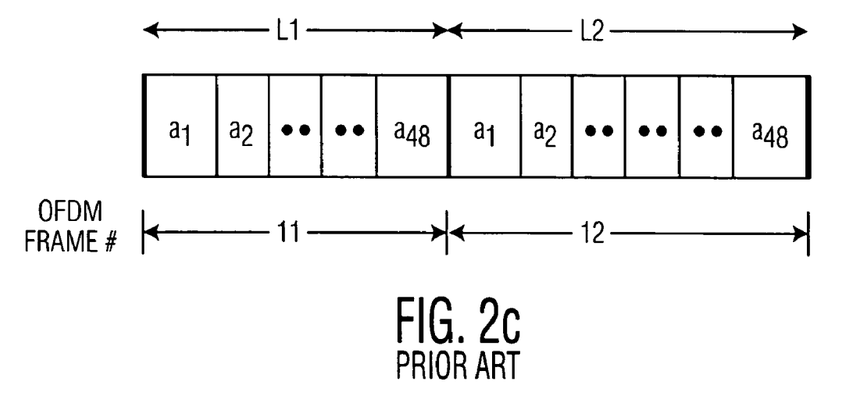
FIG. 2c is a detailed illustration of the construction of the two long training sequences, i.e., ($L_1$, $L_2$) of FIG. 2b.

FIG. 2c is a detailed illustration of the construction of the two long training sequences, i.e., ($L_1$, $L_2$) of FIG. 2b. The two long training sequences ($L_1$, $L_2$) are essential to performing the method of the invention, as will be described below. As shown in FIG. 2c, each training sequence ($L_1$, $L_2$) is comprised of 48 "known" data bits, $a_1$ through $a_{48}$. That is, both the transmitter and receiver have a-priori knowledge of the values of the data bits $a_1$ through $a_{24}$ and use the knowledge to derive a channel estimate.

Typically, only the first long training sequence, $L_1$, is used to derive a channel estimate, thereafter the channel estimate may be further refined by utilizing the second long training sequence, $L_2$ and averaging the results.

Figure 3:
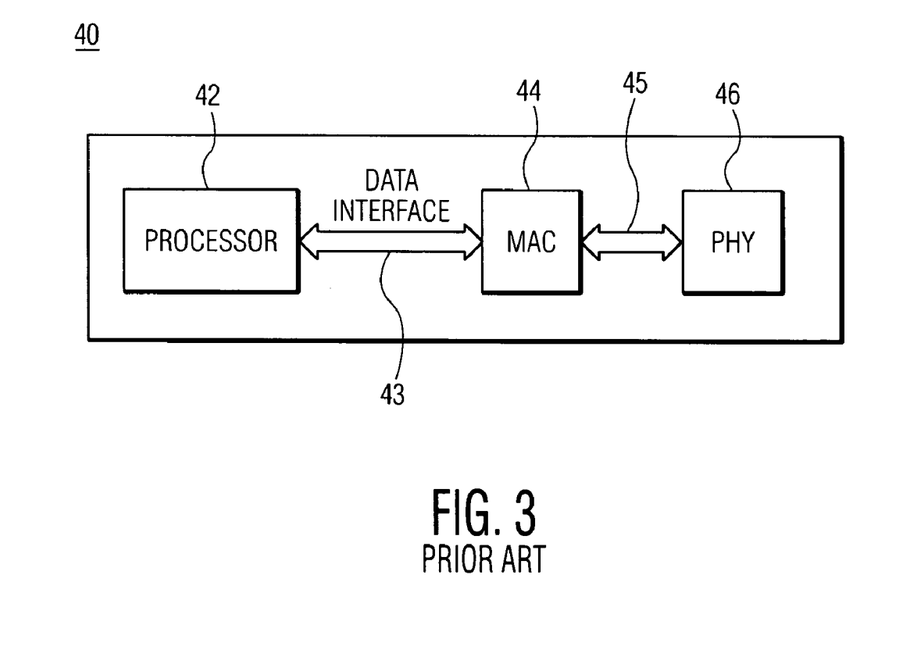
FIG. 3 illustrates the construction of a typical network node.

Referring now to FIG. 3, the construction of a typical network node 40 is shown to include a processor 42, a media access control (MAC) unit 44 connected to the processor 42 by a data interface 43, a physical layer (PHY) unit 46 connected to the MAC unit 44 by a MAC-to-PHY I/O bus 45. As discussed above, the present invention is preferably implemented as an algorithm in the PHY unit 46 of network node 40 in contrast to prior art approaches which have been implemented at the MAC layer 44.

Figure 4:
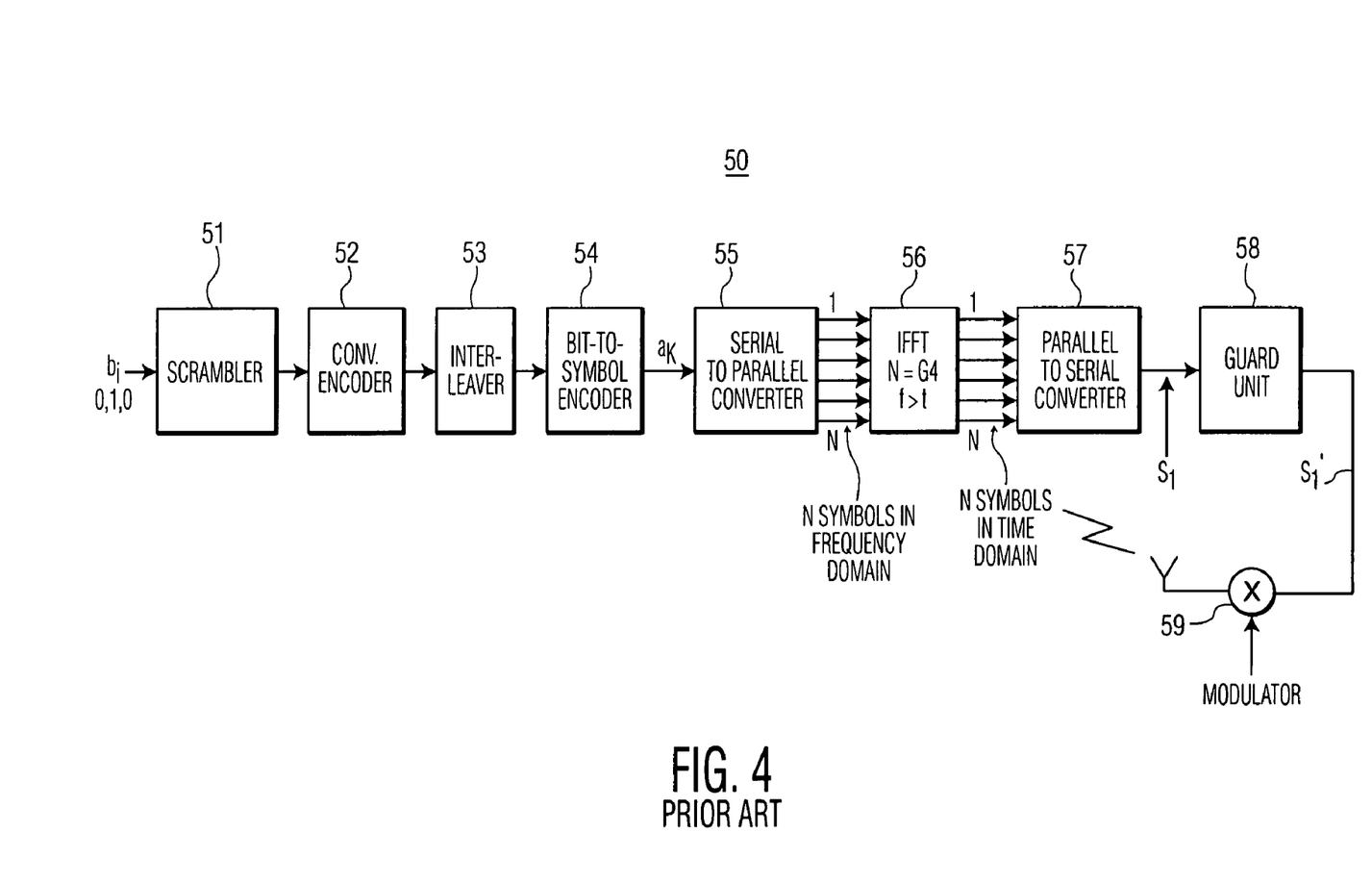
FIG. 4 illustrates a transmitter portion 50 of the PHY unit 46 for performing the Tx functions in accordance with the prior art.

FIG. 4 illustrates a transmitter portion 50 of the PHY unit 46 for performing the Tx functions in accordance with the 802.11g standard. The operations to be described with reference to FIG. 4 are well known and described in detail in the IEEE 802.11g standard. As shown, the transmitter 50 portion includes a scrambler 51, a convolutional encoder 52, an interleaver 53, a bit-to-symbol encoder 54, a serial-to-parallel converter 55, an IFFT unit 56, a parallel-to-serial converter 57 and a guard interval generator unit 59.

During a data transmit process, The MAC interface 24 provides the data bits $b_i$ via the MAC-to-PHY I/O bus 26 to the scrambler 51. The scrambler 51 ensures that the data as presented to the input of the convolutional encoder 52 is substantially random in pattern. The convolutional encoder 52 encodes the scrambled data pattern in a forward error correction code and the bit interleaver 53 subsequently interleaves the encoded data. As is well known in the art, the convolutional encoder 52 is provided with a puncturing block for converting the convolutional encoder's output from a ½ coding rate to some other coding rate, e.g., ⅔, from the basic code. The interleaved encoded bits, output from the Interleaver 53, are input to a bit-to-symbol encoder 54 which groups the interleaved/encoded bits into data symbols, $a_k$, of a predetermined length as specified by the modulation mode or type. The data symbols, $a_k$, are then supplied to a serial-to-parallel converter 55 in a group of N symbols where N=48 data symbols plus 12 zero-fill symbols in the present 802.11g embodiment. The symbol stream that is output from the serial-to-parallel converter 57 is supplied as input to an IFFT unit 56 and are processed therein to transform the N supplied data symbols from the frequency domain to the time domain.

In the present embodiment, at each iteration, the IFFT unit 56 outputs N=64 complex values in parallel. The 64 complex numbers output from the IFFT unit 56 are supplied as input to a parallel-to-serial converter unit 57 which outputs a serialized stream $S_1$.

The serialized stream $S_1$ is then supplied as input to a guard interval unit 58. Due to the long symbol duration in an 802.11g system, inter-symbol interference may be caused by the channel time dispersion which can be eliminated by using a guard interval as a prefix to every transmitted data packet. In order to maintain the orthogonality of the data packets, the content of each prefix is a copy of the last part of the current data packet, thus making each data packet seem partially cyclic. As such, the guard interval is conventionally referred to as a cyclic prefix. The length of the cyclic prefix is chosen to be greater than the length of the channel impulse response. In the present embodiment, for an 802.11g system, the cyclic prefix is chosen to be 16 FFT symbols (0.8 μsec) which gives a total length of 4 μsec for each OFDM frame duration. It is noted, however, that the cyclic prefix length may be greater than or less than 16 symbols in alternate embodiments.

The modified symbol stream $S_1'$ now consists of 80 complex symbols (16 appended cyclic prefix symbols plus 64 data symbols (48 data symbols+12 zero-fill symbols) supplied from the IFFT unit 56), which is then modulated for transmission by the modulator 59 over the wireless medium in accordance with one of the defined OFDM modulation formats or types.

Figure 5:
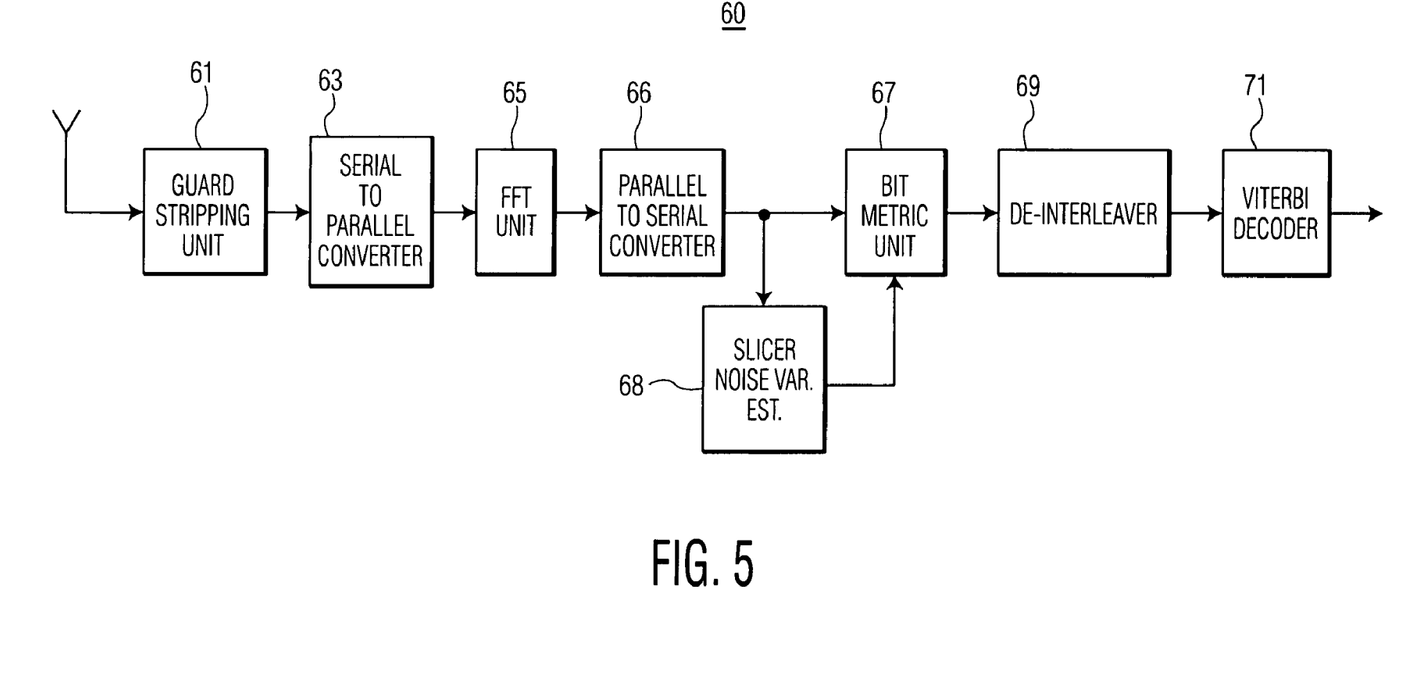
FIG. 5 is a block diagram illustrating those elements which make up the receiver portion of the PHY unit of FIG. 4 for performing the Rx functions.

FIG. 5 is a block diagram illustrating those elements which make up the receiver 60 portion of the PHY unit 22 for performing the receiver (Rx) functions. As shown, the receiver 60 includes a guard stripping unit 61 for stripping out the guard interval, i.e., the 16 cyclic prefix symbols which were appended at the transmitter 50. What remains thereafter is the original symbol stream comprised of 64 complex data symbols. Next, the stripped down data stream of 64 complex data symbols are supplied to a serial-to-parallel converter 63 which outputs the 64 complex symbols to the Fast Fourier transform (FFT) unit 65 which transforms the 64 complex symbols from the time to the frequency domain, one value for each frequency bin, k.

It is noted that in the in the present 802.11g embodiment, the FFT size is 64, which represents the number of carriers, k. Of course, one of ordinary skill in the art would recognize that the size of the FFT may be different for different applications. The 64 complex values in the frequency domain are output from the FFT unit 65 and provided as input to a parallel-to-serial unit 66 for conversion back to a serialized stream. The serialized stream output from the parallel-to-serial unit 66 is simultaneously provided to the bit metric unit 67 and to the slicer and noise variance estimator unit 68. The noise variance estimator 68 performs two operations on the serialized stream. A first operation is to slice each data symbol $a_k$ in the stream to its nearest constellation point. A second operation is to compute a noise variance estimate. The sliced data symbols and noise variance estimate are provided as inputs to the bit metric unit 67 which computes soft-metric values for each of the 1, 2, 4, or 6 bits ($b_0$ through $b_5$) which make up a sliced data symbol $a_k$. A sliced data symbol may include 1, 2, 4 or 6 bits depending upon the particular application. As is well known to those in the art, the transmitted symbol $a_k$ can be derived from any of the well-known constellations including, BPSK, QPSK, 16QAM or 64 QAM in which $a_k$ represents 1, 2, 4 or 6 bits respectively.

Soft-metric values are computed in the Bit Metric Unit 67 and de-interleaved in the de-interleaver 69. The de-interleaved values are then provided to the Viterbi decoder 71. It is noted that soft-metric value are computed by the bit metric unit 67 as a requirement of the Viterbi decoder 71.

The inventors recognize that at point "A" in the receiver the received signal $r_k$ at frequency bin k has the general form:

$$r_k = H_k a_k + n_k, k=1, \ldots, N \quad (1)$$

Where:

$r_k$ is a received signal at frequency bin k;

$H_k$ represents the channel value at frequency bin k;

$a_k$ represents the actual value of the transmitted symbol which is known by the receiver (i.e., $a_k$ is a symbol from $L_1$, the long training sequence);

$n_k$ represents the noise at frequency bin k with variance $\sigma_k^2$; and

N represents the number of carriers (i.e., the FFT size).

Equation (1) is a generalized expression for a received signal, $r_k$ which results from the transmission of a known symbol $a_k$ multiplied by a channel factor $H_k$ plus any additive noise, $n_k$. Data symbols $a_k$ in equation (1) are transmitted as part of the long training sequence portion of a data packet (see FIG. 2c) are known a-priori at both the transmitter and receiver for the purpose of estimating the channel characteristic $H_k$.

To calculate the soft-metric, first define the subset of constellation points $C^p_i$ as the set of symbols from the defined constellation such that $b_i=p$ where p is either 0 or 1. A first step is to find two symbols $a_{0,i}$ and $a_{1,i}$ for each bit $b_i$ as shown in equations (2) and (3):

$$a_{0,i} = \arg\min |a_k \epsilon C_i^a| |r_k - H_k a_k|^2 / \sigma_k^2 \quad (2)$$

$$a_{1,i} = \arg\min |a_k \epsilon C_i^a| |r_k - H_k a_k|^2 / \sigma_k^2 \quad (3)$$

Where: $a_{0,i}$ is the probability that the ith bit is a zero; and $a_{1,i}$ the probability that the ith bit is a one.

The soft-metric, $m_k(b_i)$ can then be calculated as:

$$m_k(b) = \frac{|r_k - H_k a_{0,i}|^2 - |r_k - H_k a_{1,i}|^2}{a_k^2} \quad (4)$$

An important observation regarding equation (4) is that, in a conventional receiver, such as the one shown in FIG. 5, the noise is assumed to be white. Specifically, the noise variance term, $\sigma_k^2$, shown in the denominator of equation (4) is assumed to be a constant for all frequencies, k, and is ignored. However, in the case where interference is present in the band, such as Bluetooth interference, the noise variance is not a constant but instead varies with frequency. Accordingly, some number of frequency bins, k, have a higher noise value than others. Therefore, in the case of interference being present in the band, the noise variance term, $\sigma_k^2$, cannot be neglected. Doing so would result in severely degraded performance.

The inventors have recognized the need to account for the presence of interference in the band and have created a simplified interference model. In the simplified interference model, it is assumed that a Bluetooth system is operating at 1 MHz in the same band as an 802.11g system. In this scenario, each transmitted 802.11g packet would have 3 consecutive frequency channels, $k_i$ to $k_{i+2}$, from among the N=64 channels of operation that would include additional Gaussian noise interference with a variance of $\sigma_b^2$. In accordance with the simplified interference model, a channel estimate may be developed, as will be described hereafter.

In accordance with the prior art approach for deriving a channel estimate, equation (1) is solved for $H_k$ while ignoring the noise term, $n_k$, which is assumed to be white gaussian noise (AWGN) with zero mean and variance. Solving equation (1) for $H_k$ under an assumption of white noise yields:

$$H_k = r_k / a_k \quad (6)$$

The noise term, $n_k$, may be ignored in those cases where the noise is assumed to be flat across the band, i.e., AWGN. Under this assumption, the channel value or response $H_k$ at each frequency bin, k, is independent of the response at every other frequency bin.

It is to be appreciated, however, that while the assumption of noise being flat across the band simplifies the channel estimate, it suffers in two important respects. First, by using a cyclic prefix length of 16 symbols, it is assumed that the impulse response of the channel is not very wide in time.

Because of the linearity between the frequency and time domain, 16 independent samples in time correspond to 16 independent samples in frequency. Therefore, even though the FFT size is 64 in 802.11g, only 16 of the 64 samples in frequency are independent samples. The conventional "simplified" channel estimate of equation (6) does not take this correlation into consideration.

A second drawback of using the simplified channel estimate of equation (6) is that all information about the noise term is disregarded. This is commonly referred to in the art as zero forcing or equalizing.

The present invention overcomes the stated drawbacks by providing an estimate for the noise term. Providing a noise estimate is particularly advantageous in the situation where there is interference present in the band, such as bluetooth interference, the problem to which the present invention is particularly directed.

$$a_{0,i} = \arg\min |a_k \epsilon C_i^a| \|r_k - H_k a_k\|^2 / \sigma_k^2 \tag{2}$$

$$a_{1,i} = \arg\min |a_k \epsilon C_i^a| \|r_k - H_k a_k\|^2 / \sigma_k^2 \tag{3}$$

FIRST EMBODIMENT FOR DERIVING A CHANNEL ESTIMATE

An embodiment of the invention is now described for simultaneously estimating the channel and noise in the presence of narrowband interference (e.g., Bluetooth interference) and thereby improving the system performance.

The inventors recognize that the channel impulse response in the time domain has a corresponding structure in the frequency domain which is a Fourier structure. In the frequency domain, the Fourier transform of the channel impulse response, $h_i$, may be written as:

$$H_k = \sum_{n=0}^{Ne-1} h_n \exp(j2\pi nk/N) k = 0_n \ldots, N-1 \tag{7}$$

Equation (7) can be re-written in matrix form as a time/frequency relation as:

$$[H] = [F][h] \tag{8}$$

Figure 6:
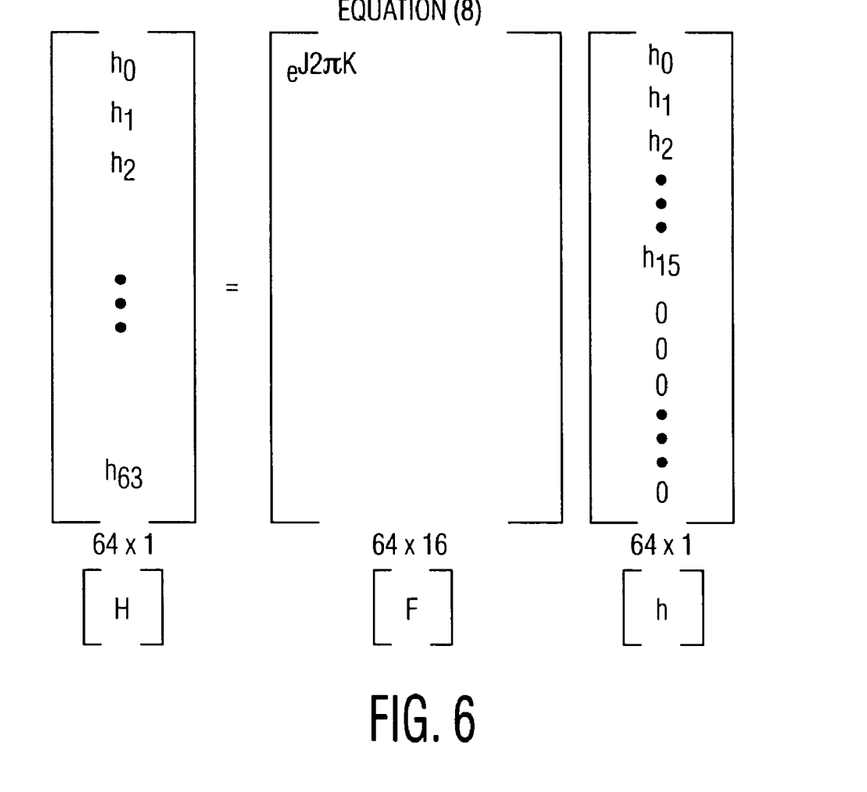
FIG. 6 illustrates the matrix components which make up the channel impulse time/frequency relation.

FIG. 6 illustrates an expanded view of the elements of the matrices of equation (8). As shown, the channel impulse response in frequency [H], is shown to be an (N×1) (e.g., 64×1) matrix, matrix [F] is an N×$N_c$ (e.g., 64×16) truncated Fourier matrix and is multiplied by matrix [h] which is an (N×1) (e.g., 64×1) matrix representing the channel response in the time domain. It is noted that, for the present embodiment, matrix [h] includes only 16 non-zero values, $h_0$-$h_{15}$, which correspond to the number of independent variables in time. The 16 values correspond to the length of the cyclic prefix.

Substituting the time/frequency matrix relation of equation (8) into equation (1) and re-writing $a_k$ in matrix form yields a matrix solution for the received signal model at point "A" in the receiving chain (see FIG. 5, pt. "A"):

$$r = [A][F][h] + [n] \tag{9}$$

Where: A is an N×N diagonal matrix composed of the known transmitted symbols $a_k$.

Both matrices [A] and [F] are known a-priori for the training frame. Defining $R_n$ to be the correlation matrix of the noise vector [n], and [G]=[A][F], the least-squares estimate of the channel impulse response vector and frequency response vector may be written as follows:

$$\hat{h}_{LS} = (G^H R_n^{-1} G)^{-1} G^H R_n^{-1} r \tag{10}$$

$$\hat{H}_{LS} = F(G^H R_n^{-1} G)^{-1} G^H R_n^{-1} r \tag{11}$$

Two observations may be made from equations (10) and (11). First, given that the cyclic prefix length Nc=N, and the noise correlation matrix, $R_n = \sigma^2 I$, where I is the identity matrix, equation (11) may be reduced to equation (6), the "simplified" channel estimate. Second, with the exception of the noise correlation matrix, $R_n$, all of the matrices required in the frequency estimate of the channel, i.e., $H_k$, are known beforehand and can be pre-computed at the receiver. That is, both matrices [A] and [F] and therefore [G] are known a-priori for the training frame, $L_1$. Also, $r$ is known as the received vector. The only unknown in equation (11) is the noise correlation matrix, $R_n$. Therefore, if white noise is assumed, the receiver simply needs to perform one matrix-vector multiplication with the received vector r, to obtain the channel estimate as follows:

$$\hat{H}_{LS} = F(G^{11} G)^{-1} G^{11} r \tag{12}$$

The present invention takes advantage of these two stated observations so as to derive a channel and noise estimate in accordance with the method of the invention. Specifically, the method may be generally characterized as a two-step approach. First, a simplified channel estimate is made assuming white noise (despite the actual presence of interference in the band). Second, having derived a channel estimate under the assumption of white noise at the first step, the noise may then be easily estimated. Each step is described in detail below.

In accordance with the first embodiment for making a channel and noise estimate in an interference environment, a simplified channel estimate is first derived assuming white noise. An assumption of white noise in an actual interference environment is a reasonable one to obtain a channel estimate by considering the noise correlation matrix, $R_n$, of FIG. 7. In the case of narrowband interference, only a small percentage of the total number of values in the noise correlation matrix, $R_n$ will have higher noise values. For example, in the specific case of narrowband Bluetooth interference, it may be shown that only 3 of the 64 frequency noise variance terms in the correlation matrix $R_n$ will have higher noise variance values. Given this relatively low percentage, i.e., 0.047, an initial assumption of white noise so as to obtain a channel estimate is both reasonable and justifiable for the reasons stated.

Figure 7:
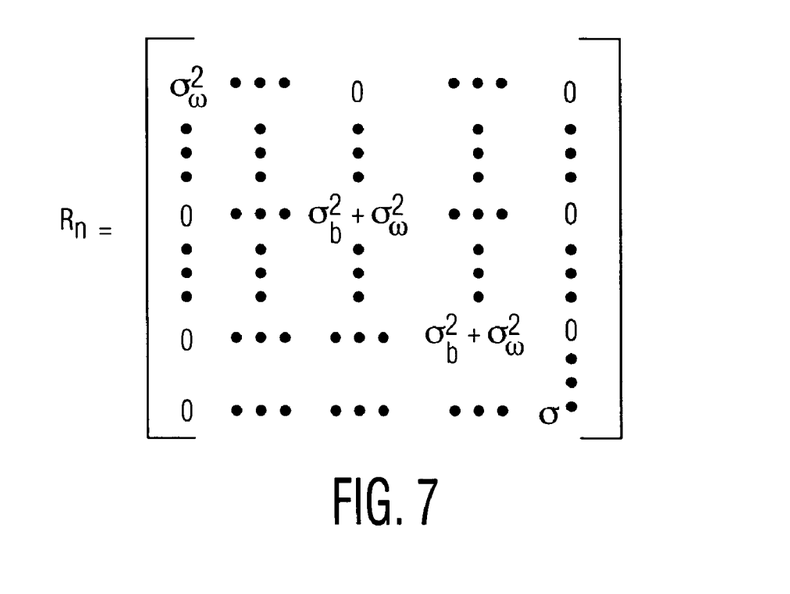
FIG. 7 illustrates the noise correlation matrix, $R_n$.

Under the assumption of white noise, the noise correlation matrix, $R_n$ of equation (11), as illustrated in FIG. 7, becomes an identity matrix I and the receiver simply needs to perform one matrix-vector multiplication with the received vector, $r$, to obtain the simplified channel estimate $H_k$. Equation (11) reduces to equation (12) under the white noise assumption.

$$\hat{H}_{LS} = F(G^{11} G)^{-1} G^{11} r \tag{12}$$

Having made a channel estimate at a first step of the method, the noise variance estimate must then be determined. To do so, the channel estimate as computed by equation (12) at the first step, is now substituted back into equation (1). The noise variance at each frequency can be estimated as follows. Using the previously determined channel estimate, define $e$ to be the error vector:

$$e = r - A\hat{H}_{LS}$$

Then, the noise variance estimate is derived from the error vector as:

$$\sigma_k^2 = |e_k|^2 \quad (14)$$

The channel and noise variance estimates in frequency, as denoted in equations (11) and (14) may then be averaged over the two long training frames, L1 and L2 included each data packet for each frequency bin k.

FIRST EMBODIMENT OF AN IMPROVED NOISE ESTIMATE

It has been experimentally determined that the channel estimate, as computed in equation (12), provides a satisfactory estimate when averaged over the two long training sequences. However, it has also been determined that the noise variance estimate, as computed in equation (14), does not provide a satisfactory estimate when averaged over the two long training sequences (L1 and L2) due to the fact that the noise is a more random process. As such, the noise needs to be further averaged in order to reduce the variance of the estimate.

Figure 8:
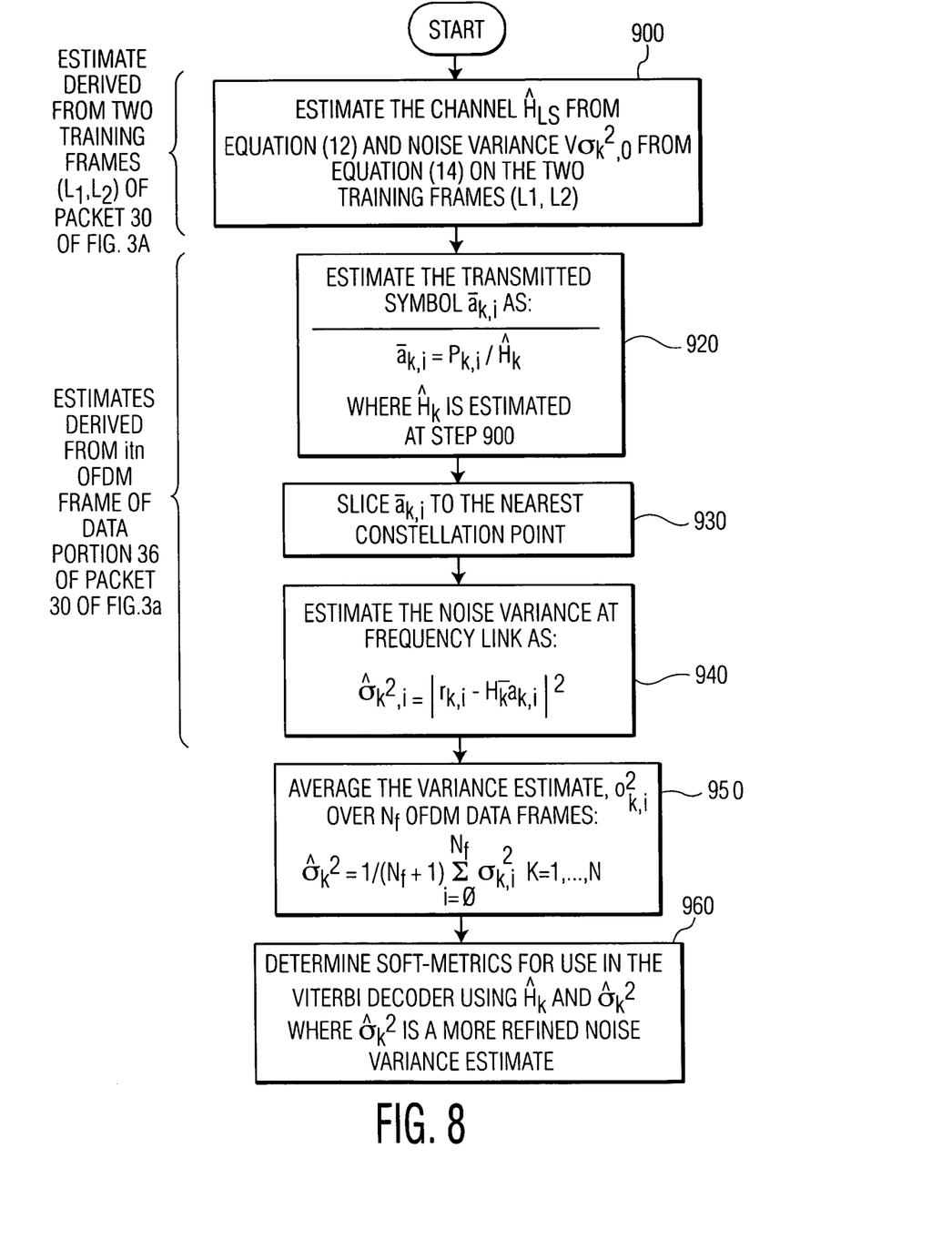
FIG. 8 is a flowchart describing the steps for obtaining a more refined noise estimate in accordance with an embodiment of the invention.

As described above, the channel and noise variance estimates, i.e., equations (12) and (14), were obtained from the two long training intervals ($L_1$ and $L_2$) contained in the PLCP preamble portion 32 (See FIG. 3) of the data packet 30. Once the channel and noise estimates are obtained using training intervals ($L_1$ and $L_2$), only the data frame portion 36 of packet 30 is available to obtain a more refined noise estimate. In this regard, having only the data frame portion 36 of packet 30 available for making a more refined noise estimate is problematic in that the data frame portion 36, unlike the PLCP preamble portion 32, does not include any known data symbols (e.g., $a_1$ through $a_{24}$). Therefore, obtaining a more refined noise estimate requires a further processing step. Namely, the transmitted symbols of the data frame portion 36 must first be estimated (because they are not known by the receiver) as a pre-requisite to obtain the more refined noise estimate. FIG. 8 is a flowchart describing the steps for obtaining an improved noise estimate.

At step 900, estimate $\hat{H}$ from equation (12) and $\sigma^2$ from equation (14) on the two training frames ($L_1$ and $L_2$).

At step 920, during the ith OFDM data frame contained in the data frame portion 36 of packet 30, use the channel estimate H(cap)LS obtained at step 900 to estimate the transmitted data symbol at frequency k and time I as follows:

$$\hat{a}_{i,i} = r_{k,i}/\hat{H}_k$$

$\hat{a}_{i,i} = \bar{a}_{k,i}$ sliced to nearest constellation point

As stated above, data symbol estimation is required here because the data frame portion 36 of packet 30 does not contain data symbols which are known a-priori at the receiver.

At step 930, slice the estimated data symbol, $\hat{a}_{k,I}$ to the nearest constellation point:

At step 940, estimate the noise variance at frequency bin k for the ith OFDM frame as $$\hat{\sigma}_{k,i}^2 = |r_{k,i} - \hat{H}_k \hat{a}_{k,i}|^2$$

At step 950, average the variance estimates as follows:

$$\hat{\sigma}_k^2 = \frac{1}{N_f + 1} \sum_{i=0}^{N_j} \hat{\sigma}_{k,i}^2 \, k = 1_n \ldots, N$$

Where: $N_f$ is the number of OFDM frames used for averaging the estimate.

At step 960, the channel and noise estimates obtained at steps 900 and 950, respectively, may now be used in equations (12) and (14) to determine soft-metrics for use in the Viterbi decoder 71 of FIG. 5.

SECOND EMBODIMENT FOR PROVIDING AN IMPROVED NOISE ESTIMATE

In accordance with a second embodiment for providing an improved estimate of noise variance, to further enhance the noise variance estimate than what can be achieved in the prior embodiment, it is possible to employ an advanced slicer and noise variance estimation unit as a substitute for the basic slicer and noise variance estimation unit 68 of the receiver 60 of FIG. 8. The advanced slicer works on the principle of deriving better estimates for the data symbols by re-encoding and decoding the received data symbols over some number of iterations such that each subsequent iteration provides a better estimate of the received data symbol which may then be used to derive a better estimate of the noise variance.

Figure 9A:
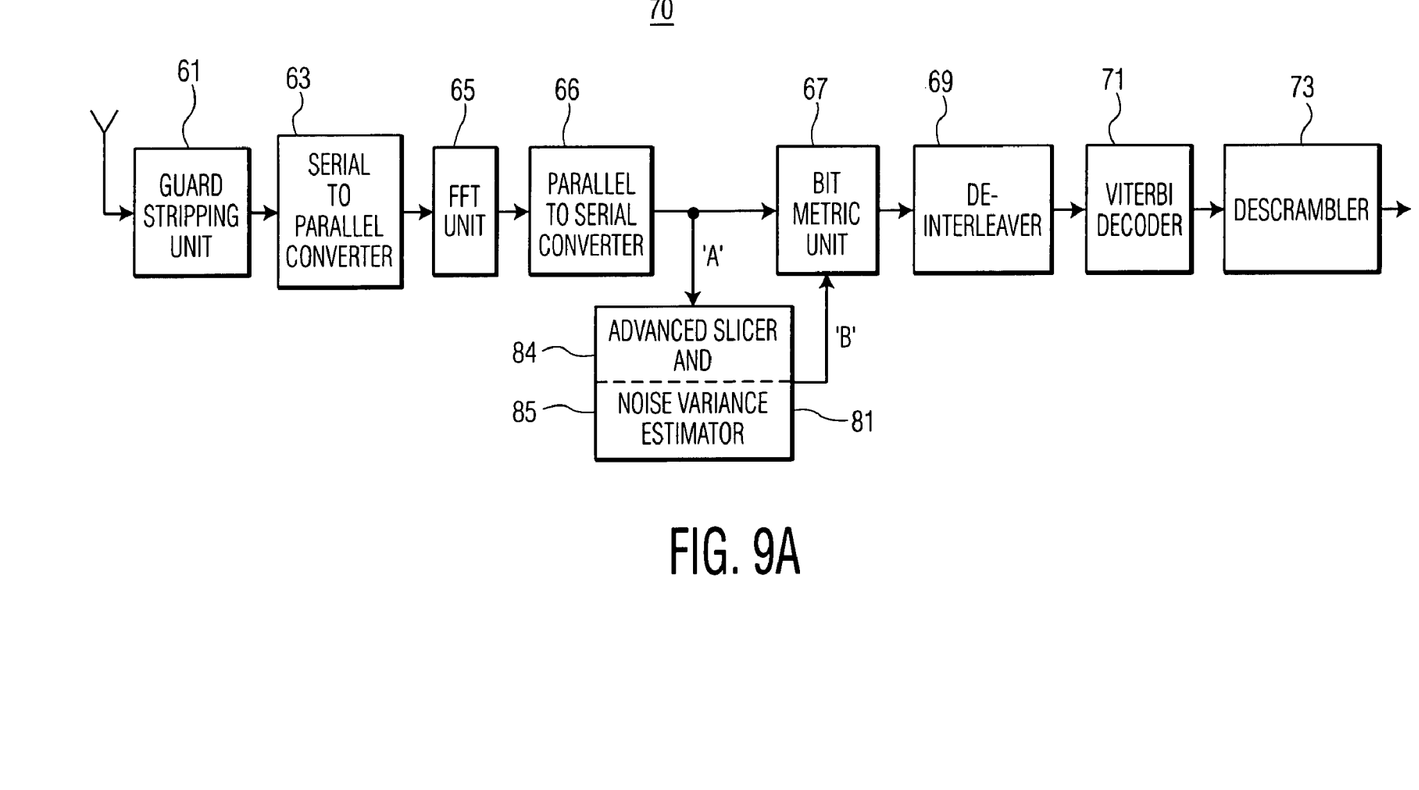
FIG. 9 is a diagram of the receiver of FIG. 5 modified to incorporate an advanced slicer in accordance with an embodiment of the invention.

FIG. 9a is a diagram of the receiver 60 of FIG. 5 modified to incorporate an advanced slicer in accordance with the present embodiment. In the modified receiver 70 of FIG. 9, the advanced slicer and noise variance estimation unit 81 substitutes for the basic slicer and noise variance estimation unit 68 of FIG. 5.

Figure 9B:
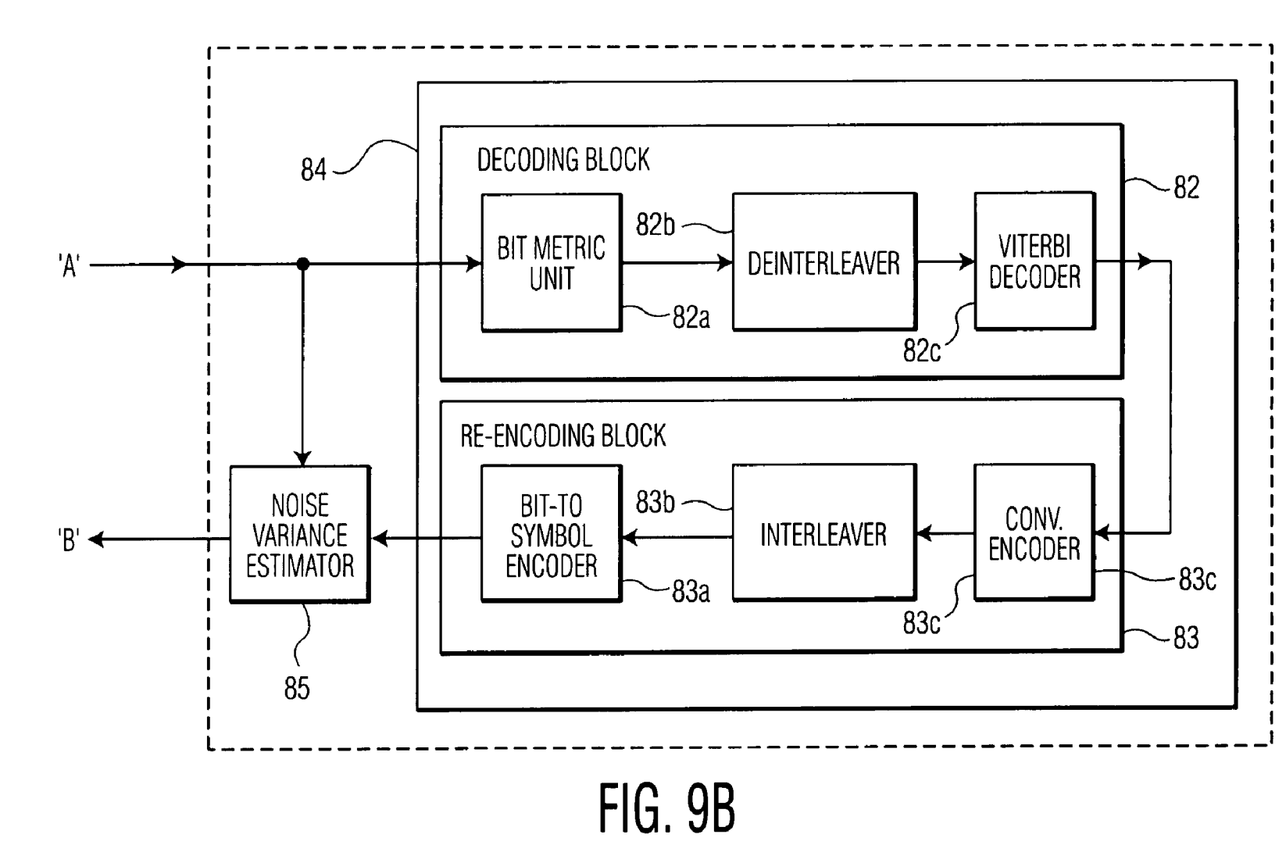

FIG. 9b is a block diagram illustrating in more detail the construction of the advanced slicer and noise variance estimation unit 81 of receiver 70. As shown the advanced slicer and noise variance estimation unit 81 is made up of two components, the advanced slicer 84 and the noise variance estimator 85. The advanced slicer 84 is further comprised of two components, a decoding block 82 whose output is coupled to the input of a re-encoding block 83. In this manner, the data symbols of the serial data bit stream received at point 'A' are decoded and then re-encoded to output a serial data bit stream, at point 'B', including more accurate reference data symbols for the noise variance estimator 84.

Figure 10:
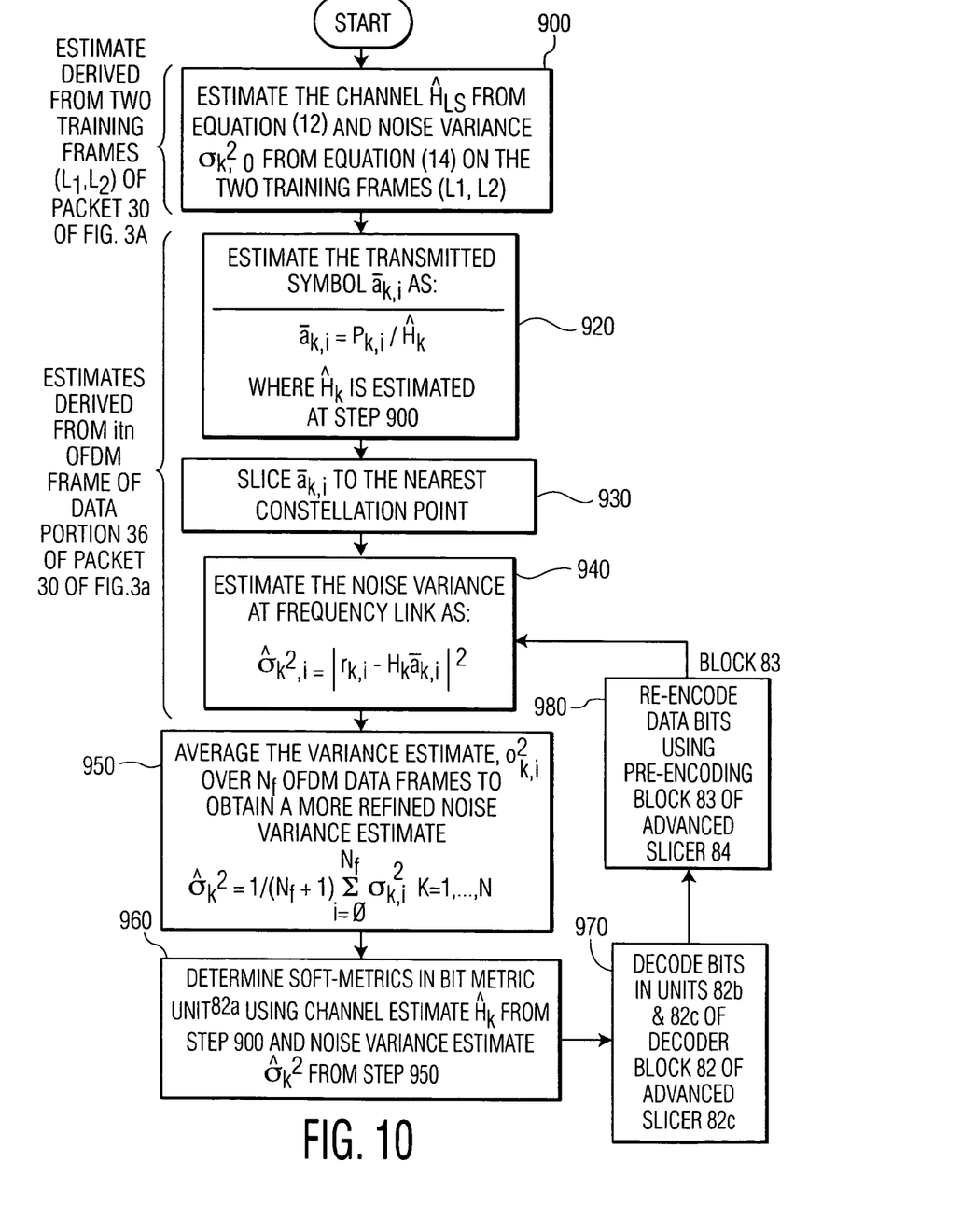
FIG. 10 is a flowchart describing the steps for obtaining a more refined noise estimate in accordance with a second embodiment of the invention.

FIG. 10 is a flowchart describing the steps for obtaining a more refined noise estimate in accordance with the present embodiment.

The flowchart of FIG. 10 repeats steps 900-950 of the flowchart of FIG. 8 and such will not be further described. In addition to the known steps, the flowchart of FIG. 10 modifies step 960 and includes additional steps 970 and 980 which define the operations of the advanced slicer and noise variance estimator (block 81) as illustrated in FIGS. 9a and 9b.

With reference to the flowchart of FIG. 10, starting with step 960, a more refined noise estimate is obtained by using the averaged noise variance estimate obtained at step 950 and the channel estimate from step 900 to determine soft-metrics for the data portion (data symbols) 36 of received OFDM packet 30. The soft-metrics are computed in the advanced slicer and noise variance estimator unit 81 of FIG. 9a. More particularly, the soft-metrics are computed in the bit metric-unit 82a of advanced slicer unit 81. Then, the computed soft-metric values are de-interleaved at block 82b and supplied to the Viterbi decoder 82c, at step 970. The decoding operations described 82a, 82b, 82c collectively comprise the decoding block 82 of the advanced slicer 81. Thereafter, at step 980, the output of the decoding block 82 is supplied as input to the re-encoding block 83 to re-encode the once-decoded data bits. As shown in the flowchart, the re-encoded data bits are then supplied as input to block 940 to estimate the noise variance again using the decoded/re-encoded data bits in the feedback loop 960-980. It is noted that this feedback loop may be used for any number of iterations necessary to obtain a noise variance estimate which meets or exceeds a certain prescribed threshold.

As is apparent from the foregoing, the present invention has an advantage in that it is possible for a receiver in an 802.11g WLAN system to estimate the unknown multi-path channel and the interference variance simultaneously without a prior knowledge of the location of the interferer in the band and use the information to generate soft-metrics for a Viterbi decoder.

What is claimed is:

1. In a wireless local area network (WLAN), a method for estimating an unknown multi-path channel and a noise variance in the presence of narrowband interference, said method comprising the steps of:
    (a) receiving a time domain OFDM data packet;
    (b) converting said time domain OFDM data packet to a frequency domain OFDM data packet;
    (c) extracting a vector of training symbols having known transmitted values from said frequency domain OFDM data packet;
    (d) using said training symbols to derive a simplified channel estimate that assumes no interference is present in the unknown multi-path channel, and
    (e) estimating a noise variance of said narrowband interference using said simplified channel estimate at said step (d).

2. The method of claim 1, wherein said WLAN is operated in accordance with the IEEE 802.11 standard.

3. The method of claim 1, wherein said step (d) of deriving said simplified channel estimate further comprises the steps of:
    (1) recognizing a time-frequency relationship of a channel impulse response in the time domain to a channel impulse response in the frequency domain as:

$\underline{H}=F\underline{h}$ (2) using the recognized time-frequency relationship, $\underline{H}=F\underline{h}$, to derive a matrix solution of a received signal model in the frequency domain as:

$\underline{r}=A(F\underline{h})+\underline{n}$ where
    F is an N×Nc truncated Fourier matrix;
    $\underline{h}$ is the channel impulse response in the time domain;
    A is an N×N diagonal matrix comprised of said plurality of known transmitted data symbols; and
    $\underline{n}$ is the noise vector;
    (3) calculating a least squares estimate of the channel impulse response $\underline{H}$ as:

$H_{LS}=F(G^H R_n^{-1} G)^{-1} G^H R_n^{-1} \underline{r}$ (4) neglecting a noise correlation matrix term $R_n^{-1}$ of the calculated least squares estimate of the channel impulse response $\underline{H}$ at step (3) to compute said simplified channel estimate in the frequency domain as:

$H_{LS}=F(G^H G)^{-1} G^H \underline{r}$ where F and A and G=AF are matrix values which are all known a-priori for long training sequences L1 and L2 at a receiving node in said WLAN.

4. The method of claim 2, where said step (e) of estimating said noise variance further comprises the steps of:
    computing an error vector e as:

$\underline{e}=\underline{r}-A\hat{\underline{H}}_{LS}$ and calculating said noise variance estimate as:

$\sigma_k^2=|e_k|^2$.

5. In a wireless local area network (WLAN), a method for estimating an unknown multi-path channel and a noise variance in the presence of narrowband interference, said method comprising the steps of:
    (a) receiving a time domain OFMD data packet;
    (b) converting said time domain OFDM data packet from said time domain to a frequency domain OFDM data packet;
    (c) using training symbols from long training sequences L1 and L2 contained within said OFDM data packet to derive a simplified channel estimate in frequency as:

$H_{LS}=F(G^H G)^{-1} G^H \underline{r}$ where F and A and G=AF are matrix values which are all known a-priori for said long training sequences L1 and L2 at a receiving node in said WLAN;
    (d) estimating a noise variance of said narrowband interference using said simplified channel estimate at said step (a), comprising the steps of:
    (1) computing an error vector e as:

$\underline{e}=\underline{r}-A\hat{\underline{H}}_{LS}$; and (2) calculating said noise variance estimate as:

$\sigma_k^2=|e_k|^2$;

(e) estimating a transmitted symbol as $a_{k,I}=r_{k,I}/\hat{H}_k$ (f) slicing said estimated transmitted symbol $a_{k,I}$ to the nearest constellation point;
    (g) estimating the noise variance at frequency k as:

$\hat{\sigma}_{k,i}^2=|r_{k,i}-\hat{H}_k \hat{a}_{k,i}|^2$ (h) averaging the noise variance estimate over N OFDM data frames to obtain a more refined noise variance estimate as:

$$\hat{\sigma}_k^2 = \frac{1}{N_f+1} \sum_{i=0}^{N_f} \hat{\sigma}_{k,i}^2, k=1_n\ldots,N.$$

6. The method of claim 5, wherein said a more refined averaged noise variance estimate than that obtained at said step (d) is computed as:

$\sigma_k^2=W_L \sigma_{k,0}^2+W_0/Nf\Sigma\sigma_{k,i}^2 k=1,2,\ldots,48$ where $W_L+W_0=1$
    $W_L$=a weight corresponding to a long training sequence, e.g., $L_1$, $L_2$;
    $W_0$=a weight corresponding to one or more data frames.

7. The method of claim 5, further comprising the steps of:
    (i) decoding the sliced estimated transmitted symbol $a_{k,I}$;
    (j) re-encoding the decoded symbol at said step (e); and
    (k) repeating said steps (g) through (j) for N iterations to derive a more refined noise variance estimate than the one obtained at said step (d).

8. In a wireless local area network (WLAN), a system for estimating an unknown multi-path channel and a noise variance in the presence of narrowband interference, said system comprising:
    means for receiving a time domain OFDM data packet;

means for converting said time domain OFDM data packet to a frequency domain OFDM data packet;

means for extracting a vector of training symbols having known transmitted values from said frequency domain OFDM data packet;

means for using said training symbols to derive a simplified channel estimate that assumes no interference in said unknown multi-path channel; and means for estimating a noise variance of said narrowband interference using said simplified channel estimate at said step (d).

9. The system of claim 8, wherein said WLAN is operated in accordance with the IEEE 802.11 standard.

10. The system of claim 8, wherein said means for using said training symbols to derive a simplified channel estimate, further comprises:

means for recognizing a time-frequency relationship of a channel impulse response in the time domain to a channel impulse response in the frequency domain as:

$$\underline{H}=F\underline{h}$$

means for using the recognized time-frequency relationship, $\underline{H}=F\underline{h}$, to derive a matrix solution of a received signal model in the frequency domain as:

$$\underline{r}=A(F\underline{h})+\underline{n}$$

where

F is an N×Nc truncated Fourier matrix;

$\underline{h}$ is the channel impulse response in the time domain;

A is an N×N diagonal matrix comprised of said plurality of known transmitted data symbols; and $\underline{n}$ is the noise vector;

means for calculating a least squares estimate of the channel impulse response $\underline{H}$ as:

$$H_{LS}=F(G^H R_n^{-1} G)^{-1} G^H R_n^{-1} \underline{r}$$

means for neglecting a noise correlation matrix term $R_n^{-1}$ of the calculated least squares estimate of the channel impulse response $\underline{H}$ at step (3) to compute said simplified channel estimate in the frequency domain as:

$$H_{LS}=F(G^H G)^{-1} G^H \underline{r}$$

where F and A and G=AF are matrix values which are all known a-priori for long training sequences L1 and L2 at a receiving node in said WLAN.

11. The method of claim 10, where said estimation of said noise variance further comprises:

computing an error vector e as:

$$\underline{e}=\underline{r}-A\hat{\underline{H}}_{LS}; \text{ and}$$

calculating said noise variance estimate as:

$$\sigma_k^2=|e_k|^2.$$

12. In a wireless local area network (WLAN), a system for estimating an unknown multi-path channel and a noise variance in the presence of narrowband interference, said system comprising:

mean for receiving a time domain OFMD data packet;

means for converting said time domain OFDM data packet from said time domain to a frequency domain OFDM data packet;

means for using training symbols from long training sequences L1 and L2 contained within said OFDM data packet to derive a simplified channel estimate in frequency as:

$$H_{LS}=F(G^H G)^{-1} G^H \underline{r}$$

where F and A and G=AF are matrix values which are all known a-priori for said long training sequences L1 and L2 at a receiving node in said WLAN;

means for estimating a noise variance of said narrowband interference using said simplified channel estimate at said step (a), comprising the steps of:

(1) computing an error vector e as:

$$e=\underline{r}-AH_{LS}; \text{ and}$$

(2) calculating said noise variance estimate as:

$$\sigma_k^2=|e_k|^2;$$

means for estimating a transmitted symbol as $$a_{k,I}=r_{k,I}/\hat{H}_k$$

means for slicing said estimated transmitted symbol $a_{k,I}$ to the nearest constellation point;

means for estimating the noise variance at frequency k as:

$$\hat{\sigma}_{k,i}^2=|r_{k,i}-\hat{H}_k\hat{a}_{k,i}|^2$$

means for averaging the noise variance estimate over N OFDM data frames to obtain a more refined noise variance estimate as:

$$\hat{\sigma}_k^2 = \frac{1}{N_f+1}\sum_{i=0}^{Nj} \hat{\sigma}_{k,i}^2, k=1_n\ldots,N.$$

13. The system of claim 12, wherein said a more refined averaged noise variance estimate is computed as:

$$\sigma_k^2=W_L\sigma_{k,0}^2+W_0/Nf\Sigma\sigma_{k,i}^2 K=1,2,\ldots,48$$

where $W_L+W_0=1$ $W_L$=a weight corresponding to a long training sequence, e.g., $L_1$, $L_2$;

$W_0$=a weight corresponding to one or more data frames.

14. The system of claim 12, further comprising:

means for decoding the sliced estimated transmitted symbol $a_{k,I}$;

means or re-encoding the decoded symbol at said step (e); and means for repeating said steps (g) through (j) for N iterations to derive a more refined noise variance estimate than the one obtained at said step (d).

15. The method of claim 1, wherein using the training symbols to derive a simplified channel estimate comprises calculating a channel impulse response frequency matrix for each frequency bin in the frequency domain OFDM data packet assuming that all noise in the channel is white Gaussian noise with zero mean and variance.

16. The system of claim 8, wherein the means for using the training symbols to derive a simplified channel estimate calculates a channel impulse response frequency matrix for each frequency bin in the frequency domain OFDM data packet assuming that all noise in the channel is white Gaussian noise with zero mean and variance.

* * * * *